United States Patent
Yokota

(10) Patent No.: US 9,515,591 B2
(45) Date of Patent: Dec. 6, 2016

(54) ROTARY DRIVE MECHANISM AND LIGHT DISPERSION SYSTEM HAVING THE SAME

(71) Applicant: SHIMADZU CORPORATION, Kyoto-shi, Kyoto (JP)

(72) Inventor: Kazumi Yokota, Mishima-gun (JP)

(73) Assignee: SHIMADZU CORPORATION, Kyoto-Shi, Kyoto (JP)

( * ) Notice: Subject to any disclaimer, the term of this patent is extended or adjusted under 35 U.S.C. 154(b) by 392 days.

(21) Appl. No.: 13/739,818

(22) Filed: Jan. 11, 2013

(65) Prior Publication Data

US 2013/0188256 A1 Jul. 25, 2013

(30) Foreign Application Priority Data

Jan. 13, 2012 (JP) ................................. 2012-004846

(51) Int. Cl.
*H02P 6/00* (2016.01)
*H02P 8/32* (2006.01)
(Continued)

(52) U.S. Cl.
CPC .................. *H02P 8/32* (2013.01); *G01J 3/027* (2013.01); *G01J 3/06* (2013.01); *G02B 26/007* (2013.01); *H02P 8/12* (2013.01); *H02P 8/38* (2013.01)

(58) Field of Classification Search
CPC ............ G02B 26/007; H02P 8/12; H02P 8/38; H02P 8/32; H02P 6/00
(Continued)

(56) References Cited

U.S. PATENT DOCUMENTS

| | | | | |
|---|---|---|---|---|
| 5,625,270 | A | * | 4/1997 | Barker .......................... 318/696 |
| 5,744,929 | A | * | 4/1998 | Miyazaki ...................... 318/696 |

(Continued)

FOREIGN PATENT DOCUMENTS

| | | |
|---|---|---|
| CN | 1556379 A | 12/2004 |
| CN | 101080337 A | 11/2007 |

(Continued)

OTHER PUBLICATIONS

Examination Report received for Chinese Patent Application No. 201310011928.5, mailed on Aug. 5, 2014, 11 pages (7 pages of Official Copy & 4 pages of English Translation).

(Continued)

*Primary Examiner* — Kawing Chan
(74) *Attorney, Agent, or Firm* — Morgan, Lewis & Bockius LLP

(57) ABSTRACT

A rotary drive mechanism provides a mechanism for driving light dispersing element having a high wavelength-moving speed and a high wavelength-resolving power. The rotary drive mechanism includes a stepper motor as a rotary drive source; an update information setter for setting update information corresponding to the amount of change by which the motor should be rotated at a drive timing indicated by an input signal; a position information updater for holding position information which specifies the rotational position of the motor and for updating the position information based on the update information from the update information setter; a winding excitation state determiner for determining the amount or ratio of electric currents passed through the windings of the motor based on the updated position information provided from the position information updater; and a drive controller for controlling the electric currents based on a control signal from the winding excitation state determiner.

12 Claims, 1 Drawing Sheet

(51) Int. Cl.
  *H02P 8/12* (2006.01)
  *G02B 26/00* (2006.01)
  *H02P 8/38* (2006.01)
  *G01J 3/06* (2006.01)
  *G01J 3/02* (2006.01)

(58) Field of Classification Search
  USPC .............................. 318/615, 685, 432, 696
  See application file for complete search history.

(56) References Cited

U.S. PATENT DOCUMENTS

| | | | | |
|---|---|---|---|---|
| 6,577,957 | B2* | 6/2003 | Fujimoto et al. | 702/36 |
| 8,421,395 | B2* | 4/2013 | Maeda et al. | 318/705 |
| 2006/0220603 | A1* | 10/2006 | Takeuchi | 318/280 |
| 2007/0296358 | A1* | 12/2007 | Sato et al. | 318/139 |
| 2007/0296370 | A1* | 12/2007 | Torikoshi | 318/696 |
| 2010/0085003 | A1* | 4/2010 | Spring | H02P 8/04 318/573 |
| 2010/0301794 | A1* | 12/2010 | Hay | B26D 5/06 318/632 |
| 2010/0320955 | A1* | 12/2010 | Ando | H02P 8/38 318/696 |
| 2011/0241596 | A1* | 10/2011 | Sasaki | G05B 19/402 318/685 |
| 2011/0242669 | A1* | 10/2011 | Torii | G02B 27/0149 359/633 |
| 2011/0291604 | A1* | 12/2011 | Cheng | H02P 8/12 318/696 |
| 2012/0022819 | A1* | 1/2012 | Norton | G01J 3/28 702/94 |
| 2012/0139454 | A1* | 6/2012 | Roessler | H02P 8/40 318/5 |
| 2012/0304914 | A1* | 12/2012 | Russ | H02P 8/22 116/201 |

FOREIGN PATENT DOCUMENTS

| | | |
|---|---|---|
| CN | 101594037 A | 12/2009 |
| JP | H4-21198 U | 2/1992 |
| JP | 2000-136965 A | 5/2000 |
| JP | 2004-163126 | 6/2004 |

OTHER PUBLICATIONS

Office Action issued in the corresponding Japanese Patent Application No. 2012-004846 dated Jun. 30, 2015 (English translation attached).

* cited by examiner

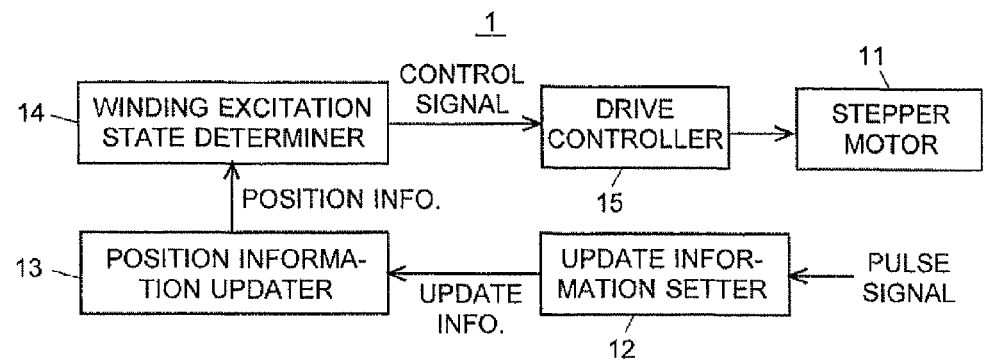
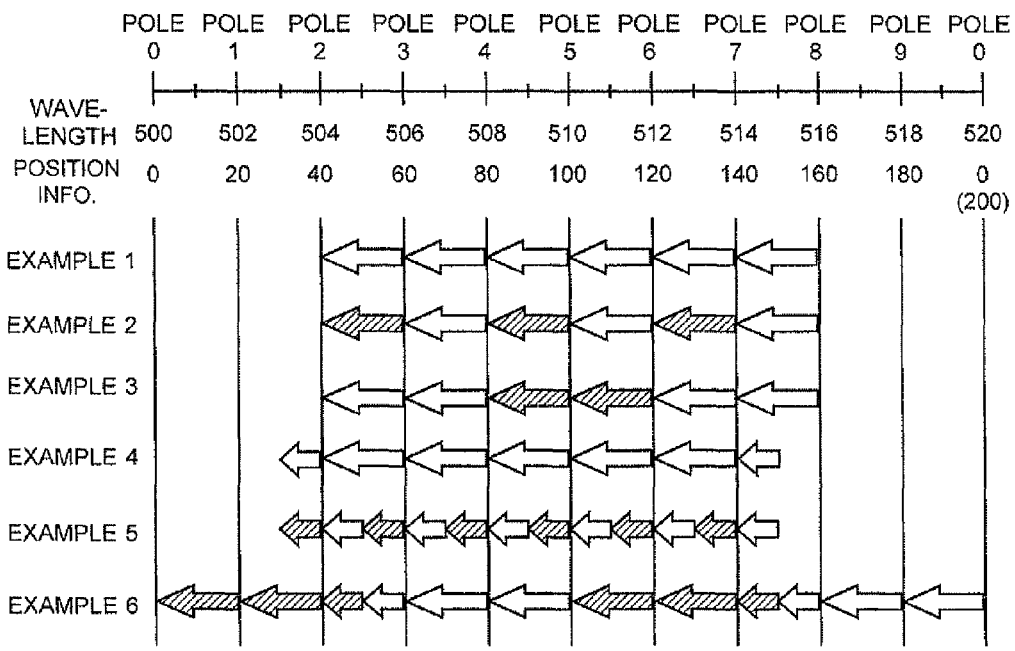

ROTARY DRIVE MECHANISM AND LIGHT DISPERSION SYSTEM HAVING THE SAME

TECHNICAL FIELD

The present invention relates to a rotary drive mechanism that can be used in a mechanism for driving a light dispersing element, and a spectrometer having this rotary drive mechanism.

BACKGROUND ART

In a spectrophotometer, such as an ultraviolet-visible spectrophotometer or atomic absorption spectrophotometer, a wavelength-dispersion spectrometer (monochromator) is used to produce monochromatic light having a predetermined wavelength. A spectrometer having a common configuration includes a dispersing element, such as a diffraction grating or prism, and a rotary drive mechanism for changing the angle of the dispersing element with respect to the incident light. By appropriately rotating the dispersing element via the rotary drive mechanism, monochromatic light having a desired wavelength can be extracted through an exit slit fixed at a predetermined position. The wavelength-resolving power for this monochromatic light depends on the width of the slit and the accuracy of the angle of the dispersing element. Achieving a high level of wavelength-resolving power requires a rotary drive mechanism capable of accurately rotating the dispersing element by minute steps (Patent Document 1).

Examples of the rotary drive mechanism include a sine-bar drive, cum drive, direct-axis motor drive, and so on. All of these mechanisms use a rotary motion of a motor. In the case of dispersion systems, stepper motors are commonly used because: 1) dispersion systems do not require an extremely high-speed rotation, 2) stepper motors allow easy positioning of the rotation shaft, and for other reasons.

BACKGROUND ART DOCUMENT

Patent Document

Patent Document 1: JP-A 2004-163126

SUMMARY OF THE INVENTION

Problem to be Solved by the Invention

The amount of wavelength movement corresponding to one step of the stepper motor is determined with respect to the trade-off between the wavelength-resolving power and the wavelength-moving speed required by the dispersion system. That is to say, when a high wavelength-moving speed is required, the amount of wavelength movement per one step is set to a large value, and when a high wavelength-resolving power is required, the amount of wavelength movement per one step is set to a small value.

By changing the amount of wavelength movement per one step in this manner, the system characteristics can be improved in terms of either the wavelength-resolving power or the wavelength-moving speed. However, since there is a trade-off between these two conditions, it is impossible to simultaneously improve both characteristics. A normally used technique for meeting the requirement of improving both characteristics is to increase the number of steps per unit time (i.e. to increase the pulse rate) while decreasing the amount of wavelength movement per one step. However, setting an excessively high pulse rate leads to an insufficient control of the stepper motor and eventually causes a step-out, making it impossible to normally rotate the motor. Accordingly, there is a limitation on the extent of improving both the wavelength-resolving power and the wavelength-moving speed by increasing the pulse rate.

The problem to be solved by the present invention is to provide a rotary drive mechanism that can be used for realizing a mechanism for driving a dispersing element having both a high wavelength-moving speed and a high wavelength-resolving power.

Means for Solving the Problems

The present invention aimed at solving the previously described problem is a rotary drive mechanism for producing a rotary motion synchronized with externally inputted drive pulses, including:

a rotary drive source having a plurality of windings as a stator;

an update information setter for setting, for each input of the drive pulses, update information which corresponds to the amount of change in the rotation of the rotary drive source per one drive pulse, and for changing the update information at an arbitrary timing;

a position information updater for holding position information relating to the rotational position of the rotary drive source, and for updating the position information based on the update information set by the update information setter;

a winding excitation state determiner for determining the excitation state of each of the windings based on the position information updated by the position information updater; and a drive controller for controlling an electric current passed through each of the windings so as to realize the excitation state of each of the windings determined by the winding excitation state determiner.

As the rotary drive source of the present invention, a stepper motor is preferable. Stepper motors are divided into two types by their driving methods. According to one method, the rotation shaft of the motor is rotated to each of the stability positions at which the windings or poles are located, With respect to the other method, the rotation shaft is rotated by an angular unit smaller than the intervals of the stability positions. The former method is called the full-step driving. The latter driving method has some variation, such as a micro-step driving, half-step driving and quarter-step driving.

In the case of a conventional rotary drive mechanism using a stepper motor, the amount of change in the rotation per one step (one drive pulse) is constantly maintained throughout the driving operation, whichever type of the aforementioned driving methods is used. By contrast, the rotary drive mechanism according to the present invention is characterized in that the amount of change in the rotation of the stepper motor per one step can be changed for each step. By this function, the following driving becomes possible.

For example, consider the case of using a micro-step driving with full-step N-division. (In the following description, the stability position is called the "full-step position", and the positions between neighboring full-step positions at which a stepper motor operating in the micro-step driving mode can be stopped are called the "micro-step positions.") According to the conventional method, the rotation shaft is rotated in angular units of 1/N of the interval of the full-step positions. On the other hand, according to the present invention, the absolute amount of change in the rotation per one step can be set within a range from the minimum of 1 (which corresponds to 1/N of the interval of the full-step positions) to the maximum of N (which corresponds to the interval of the full-step positions), with the basic unit being equal to 1/N of the interval of the full-step positions. When the amount of change is set at 1, the rotation shaft rotates with the smallest pitch in every step. This rotating speed will be doubled if the amount of change is set at 2. Setting the amount of change to N results in the fill-step drive, making the rotating speed N times as high as when the amount of change is set at 1. Thus, in the rotary drive mechanism according to the present invention, the rotating speed can be individually changed for each step by appropriately setting the amount of change. Furthermore, a movement from one micro-step position from another within the interval of the full-step positions can be achieved by one step.

In the previously described example, the resolving power of the rotational position in the rotary drive mechanism of the present invention is equal to 1/N of the interval of the full-step positions. The rotating speed changes depending on the setting of the amount of change; the highest speed is achieved by the full-step driving. In the rotary drive mechanism of the present invention, it is possible to appropriately set the amount of change for each step so that the decrease in the rotating speed associated with an improvement in the resolving power of the rotational position will be minimized.

Effect of the Invention

In the rotary drive mechanism according to the present invention, it is possible to improve the resolving power of the rotational position of a stepper motor while minimizing the decrease in the rotating speed associated with the improvement in the resolving power. Applying this rotary drive mechanism to a mechanism for driving a dispersing element realizes a wavelength-dispersion spectrometer having both a high wavelength-moving speed and a high wavelength-resolving power.

BRIEF DESCRIPTION OF THE DRAWINGS

FIG. 1 is a block diagram showing one embodiment of the rotary drive mechanism according to the present invention.
FIG. 2 is an explanatory diagram showing the timings of driving and measuring operations in the case where the rotary drive mechanism of the present embodiment is applied to a mechanism for driving a dispersing element.

BEST MODE FOR CARRYING OUT THE INVENTION

A block diagram of one embodiment of the rotary drive mechanism according to the present invention is shown in FIG. 1.

The rotary drive mechanism 1 of the present embodiment includes: a stepper motor 11 (which is hereinafter called the "motor 11") serving as the rotary drive source; an update information setter 12 for setting, for each input of a pulse signal (drive signal) from outside, update information corresponding to the amount of change by which the motor 11 should be rotated at a drive timing indicated by the input signal; a position information updater 13 for holding position information which specifies the rotational position of the motor 11 and for updating the position information based on the update information from the update information setter 12; a winding excitation state determiner 14 for determining the amounts or ratio of electric currents passed through the windings of the motor 11 based on the updated position information provided from the position information updater 13; and a drive controller 15 for controlling the electric currents based on a control signal from the winding excitation state determiner 14 so as to realize the excitation state of each of the windings determined by the winding excitation state determiner 14.

As already described, the update information setter 12 can set update information for each step. The update information may be set by referring to, for each and every step, a previously created table which relates the position information to the update information, or it may be set according to a certain rule. It is also possible to perform a predetermined calculation to set this information for each step.

In response to an input of a pulse signal, the update information set by the update information setter 12 is sent to the position information updater 13. The position information updater 13 holds information corresponding to the current rotational position (current position) of the motor 11. Upon receiving the update information, the position information setter 13 determines the next rotational position (new position) based on that information, and sends position information, including the update information, to the winding excitation state determiner 14. Simultaneously, the current position is updated with the new position.

A concrete example of the position information and update information used in the present embodiment is hereinafter described. In the present embodiment, it is also assumed the motor 11 is a five-phase motor having five windings. In this case, the number of poles consisting of the windings is 10. It is also assumed that the motor 11 is driven by a micro-step driving, with a full-step division number of 20.

As for the position information of the motor 11, the minimum amount of rotation by the micro-step driving in terms of electric angle is used as the basic unit. That is to say, in the present embodiment, since a five-phase motor is used, there are ten poles per one complete turn in terms of electric angle. The spacing between the adjacent poles is divided into 20 segments. Accordingly, the position information within one complete turn of the motor 11 in terms of electric angle is expressed by integers from 0 to 199. It is assumed that the ten poles (located at intervals of 20) are located from the integer 0 position (position number 0) and respectively numbered as "Pole 0" to "Pole 9" in the positive direction of the rotation, starting from position number 0. The update information is given by the amount of change represented by an integer value of ±1 to ±20, where positive values represent rotations in a predetermined direction while negative values represent rotations in the opposite direction.

Naturally, the update information can be expressed in other forms. For example, when there are two inputs of clockwise (CW) and counterclockwise (CCW) pulses, it is possible to set the update information using only the positive values and select one of the two pulse inputs according to the rotating direction. Another possible method is to provide a signal for specifying the rotating direction apart from the pulse input. In any of the cases using one or both of the positive and negative values as the update information, it is possible to specify the absolute value of the amount of change by a value from 0 to 19, with value 0 being interpreted as a command for performing the full-step driving (i.e. the absolute value of the amount of actual change will be 20), As still another example, the update information may include information about the actual update position as well as information about the direction of the rotation to be created in response to the pulse input.

Based on the position information including the update position received from the position information updater 13, the winding excitation state determiner 14 determines each of the winding currents to be passed through the windings of the motor 11. For example, the winding currents can be determined by reference to a previously defined table, by an interpolation based on the table information, by a full calculation, or by the calculation of a difference from the previous state.

After determining the winding currents to be passed through the windings of the motor 11, the winding excitation state determiner 14 sends the corresponding control signals to the drive controller 15. Based on these control signals, the drive controller 15 actually passes electric currents through the windings of the motor 11 to control the rotation of the motor 11.

The system described thus far can be realized by a logic circuit, such as a field programmable gate array (FPGA) or complex programmable logic device (CPLD). It may also be created in the form of a software program using a central processing unit (CPU) and digital signal processor (DSP). Using both the logic circuit and the software program is also possible.

An operation of the rotary drive mechanism 1 of the present embodiment is hereinafter described by means of FIG. 2, taking an example in which the rotary drive mechanism 1 is applied to a mechanism for driving a dispersing element. In the following description, it is assumed that position information 0 corresponds to 500 nm and the amount of wavelength movement corresponding to one step of the full-step driving is 2 nm. The number of poles of the motor 11, the full-step positions and the division number of the micro-step driving are the same as previously described.

Driving Example 1

Consider the case of moving the wavelength from 516 nm to 504 nm. This corresponds to the operation of changing the position information of the motor 11 from 160 to 40. In this case, if the update information for each pulse signal is set at −20, the position information will be decreased by 20 for each timing of driving (indicated by one arrow in FIG. 2). This driving mode is the so-called full-step driving, and the wavelength movement is completed by six pulses.

Driving Example 2

Consider the case of scanning a wavelength range from 516 nm to 504 nm at scan intervals of 2 nm. The operation of the rotary drive mechanism 1 in the present case is basically the same as in Driving Example 1, except that the motor 11 is halted for every 2-nm movement of the wavelength to perform an operation for measuring a detector signal. That is to say, the update information is set to −20, and upon an input of one pulse signal, the wavelength is moved by 2 nm, after which the operation for measuring the detector signal is performed, After the measurement is completed, one pulse signal is inputted once more to move the wavelength to the position for the next measurement. Such a process is continued over a predetermined range of measurement wavelengths. It should be noted that, in FIG. 2, the arrows indicating the timing of the measurement are shown in a hatched pattern so as to distinguish them from those indicating the timing of driving.

Driving Example 3

Consider the case of scanning the same range of measurement wavelengths as in Driving Example 2 (from 516 nm to 504 nm) at scan intervals of 4 nm. In this case, a problem occurs if the update information is set at −40 so as to make a wavelength movement of 4 nm per one pulse.

The reason is as follows: When the update information is set at −40, the initial movement is from Pole 8 (position information=160) to Pole 6 (position information=120), where Pole 7 (position information=140) is bypassed. Therefore, when the windings of the motor 11 is changed to an excitation state corresponding to position information=120, it is impossible to control the rotating direction of the motor 11, which may cause a step-out of the motor 11. Since stepper motors are normally operated by open-loop control, the occurrence of a step-out cannot be detected, so that a so-called wavelength discrepancy, i.e. a situation in which the wavelength managed inside the system differs from the wavelength actually selected by the dispersing element, may possibly occur.

To avoid this wavelength discrepancy, it is necessary to position the motor 11 at each and every Pole during its rotation. For this purpose, in the present example, the update information corresponding to each pulse is set to −20. This is equivalent to setting a wavelength movement of 2 nm per one pulse. Then, the measurement operation for the initial wavelength of 516 nm is performed, after which two pulse signals are inputted to make a wavelength movement of 4 nm. In this process, the motor 11 is rotated from Pole 8 to Pole 7, and then to Pole 6, without bypassing any Pole. Therefore, the aforementioned wavelength discrepancy does not occur. After the measurement operation for 512 nm is completed, two pulse signals are once more inputted to move the wavelength to the position for the next measurement. Such a measurement operation is continued over a predetermined range of measurement wavelengths.

Driving Example 4

Consider the case of moving the wavelength from 515 nm to 503 nm. In this example, the initial wavelength, 515 nm, is located in the middle of Poles 7 and 8, and therefore, cannot be selected by the full-step driving. This is evident because, in the present case, the wavelength-resolving power of the full-step driving is 2 nm. The same problem also arises when selecting the end wavelength, 503 nm. To address this problem by conventional techniques, it is necessary to use a half-step driving or perform a full-step driving in which the amount of wavelength movement per one step is decreased. In any of these cases, the number of pulses will be approximately doubled. Accordingly, to achieve the same wavelength-moving speed within the conventional framework, it is necessary to double the pulse rate.

However, if the original pulse rate is intended for high-speed rotations, doubling the pulse rate will make it impossible for the winding currents to follow the increased rate of change, so that the rotation will be incorrect.

In the case of the rotary drive mechanism 1 of the present embodiment, a value of 150 is set as the position information to select the initial wavelength. Then, the winding excitation state determiner 14 determines the excitation state of the wirings corresponding to that position information and sends control signals to the drive controller 15. As a result, the motor 11 rotates its shaft to the corresponding position.

In the subsequent operation of moving the wavelength in response to the pulse signals, it is necessary to initially move the wavelength to 514 nm where Pole 7 (position information=140) is located, in order to avoid the aforementioned problem of wavelength discrepancy. Accordingly, for the initial pulse signal, the update information setter 12 sets the update information to −10. As a result, the shaft of the motor 11 rotates to the position of Pole 7, after which the full-step driving can be used to rotate the motor 11 without causing any problem. For the subsequent five pulse signals, the update information setter 12 sets the update information to −20. As a result, the wavelength is moved by the fastest driving (full-step driving) to the wavelength 540 nm where Pole 2 (position information=40) is located, For the last pulse signal, the update information is set to −10, after which one pulse signal is inputted to move the wavelength to 503 nm. Thus, the wavelength movement is completed.

In the present example, the total number of pulses is seven, which is increased merely by one pulse as compared to Driving Example 1 in which the amount of wavelength movement is also 12 nm. Thus, a wavelength movement with higher wavelength-resolving power can be achieved with only a minor decrease in the wavelength-moving speed. The degree of decrease in the wavelength-moving speed will be more negligible if the range over which the wavelength should be moved is wider.

Driving Example 5

An operation of scanning the same range of measurement wavelengths as in Driving Example 4 (i.e. from 515 nm to 503 nm) at scan intervals of 1 nm is as follows: Initially, a value of 150 is set as the position information. Since the scan interval is 1 nm, the update information is set to −10. Then, the measurement is performed for every input of one pulse signal until the position information is decreased to 30. This driving mode is equivalent to the half-step driving.

Driving Example 6

Consider the case of scanning a range of wavelengths from 520 nm to 500 nm at scan intervals of 5 nm. Initially, the position information is set to 0. (When not normalized, this value corresponds to 200, since the position information is given in terms of electric angle.) For the first two pulse signals, the update information setter 12 sets the update information to −20, and for the next one pulse signal, it sets the update information to −10. As a result, the wavelength is moved to 515 nm which corresponds to 150 in terms of position information. At this position, a detector signal is acquired. To move to the next wavelength of 510 nm (position information=100), the update information is set to −10 for the first pulse signal, and then to −20 for the next two pulse signals. As a result, the system reaches the intended wavelength, 510 nm, without bypassing any Pole. At this wavelength, the measurement operation is performed. Such an operation is continued until the system reaches position information=0 where the wavelength of 500 nm is located.

The driving procedures described thus far can be summarized as follows: When the intended wavelength is not located at any of the full-step positions, the rotational position of the intended wavelength is set to a micro-step position used in a micro-step driving, and when a wavelength-moving operation including a measurement operation is performed, the rotational position is initially moved to a full-step position, after which the fastest driving (full-step driving) is performed to reach the full-step position immediately before the intended wavelength. Ultimately, the rotational position is set to the micro-step position corresponding to the intended wavelength.

The previously described Driving Examples are intended to simply illustrate the driving steps by the rotary drive mechanism 1 of the present embodiment. It in view of an actual use, the diffraction grating is directly driven by the driving shaft of the motor; the relationship between the wavelength position and the driving step of the motor will be in the form of sine or cosine waves, so that the end position of the measurement will be almost always at a micro-step position.

Naturally, the previously described embodiment of the rotary drive mechanism according to the present invention can be appropriately changed or modified within the spirit and scope of the present invention.

For example, in the previously described embodiment, the fastest driving (full-step driving) is used for the movement between the full-step positions. However, it is naturally possible to mainly use a half-step driving, quarter-step driving or other modes of micro-step driving for the purpose of reducing the oscillation of the motor during the driving operation or suppressing the shaking of the motor at the moment of stopping, rather than giving priority to the speed of operation, Even in these cases, it is necessary to temporarily halt the motor at every stability position.

The position information used in the position information updater 13, which should minimally include electric angle information, may also additionally include other kinds of information, such as information about the position of the motor shaft (either the input shaft or output shaft, or both of them) and information about the position of the dispersing element.

EXPLANATION OF NUMERALS

1 . . . Rotary Drive Mechanism
11 . . . Stepper Motor
12 . . . Update Information Setter
13 . . . Position Information Updater
14 . . . Winding Excitation State Determiner
15 . . . Drive Controller

The invention claimed is:
1. A rotary drive mechanism for producing a rotary motion synchronized with externally inputted drive pulses, including:
   a rotary drive source having a plurality of windings as a stator;
   an update information setter for setting, for each input of the drive pulses, update information which corresponds to an amount of change in a rotation of the rotary drive source per one drive pulse, and for changing the update information at an arbitrary timing;
   a position information updater for holding position information relating to a rotational position of the rotary drive source, and for updating the position information based on the update information set by the update information setter;
   a winding excitation state determiner for determining an excitation state of each of the windings based on the position information updated by the position information updater;
   and
   a drive controller for controlling an electric current passed through each of the windings so as to realize the excitation state of each of the windings determined by the winding excitation state determiner, wherein:
   the rotary drive mechanism has a first driving mode in which the rotary drive mechanism produces the rotary motion in angular units corresponding to predetermined stability positions, and a second driving mode in which the rotary drive mechanism produces the rotary motion in angular units smaller than an interval of the stability positions, and when rotating the rotary drive mechanism to an intended position, if the intended position is not located at any of the stability positions, the update information setter sets update information up to the stability position located immediately before the intended position with respect to the rotating direction as the amount of change in the rotation of the rotary drive source by the first driving mode, and sets update information from the stability position to the intended position as the amount of change in the rotation for adjusting the rotational position of the rotary drive mechanism from the stability position to the intended position in the second driving mode by one drive pulse.

2. The rotary drive mechanism according to claim 1, wherein, if a rotation initiation position is not located at any of the stability positions, the update information setter sets the update information up to a nearest stability position from the rotation initiation position as the amount of change in the rotation capable of adjusting the rotational position of the rotary drive mechanism from the rotation initiation position to the stability position in the second driving mode by one drive pulse.

3. The rotary drive mechanism according to claim 2, wherein the rotary drive source is a stepper motor.

4. The rotary drive mechanism according to claim 3, wherein the first driving mode is a full-step driving, and the second driving mode is a micro-step driving.

5. A light dispersion system, comprising a light dispersing element driven by the rotary drive mechanism according to claim 4.

6. A light dispersion system, comprising a light dispersing element driven by the rotary drive mechanism according to claim 2.

7. A light dispersion system, comprising a light dispersing element driven by the rotary drive mechanism according to claim 3.

8. The rotary drive mechanism according to claim 1, wherein the rotary drive source is a stepper motor.

9. The rotary drive mechanism according to claim 8, wherein the first driving mode is a full-step driving, and the second driving mode is a micro-step driving.

10. A light dispersion system, comprising a light dispersing element driven by the rotary drive mechanism according to claim 9.

11. A light dispersion system, comprising a light dispersing element driven by the rotary drive mechanism according to claim 8.

12. A light dispersion system, comprising a light dispersing element driven by the rotary drive mechanism according to claim 1.

* * * * *